(12) United States Patent
Claeys et al.

(10) Patent No.: US 8,558,047 B2
(45) Date of Patent: Oct. 15, 2013

(54) PROCESS FOR THE PRODUCTION OF HYDROCARBONS INCLUDING OLEFINS FROM SYNTHESIS GAS

(75) Inventors: Michael Christian Maximillian Claeys, Western Cape (ZA); Eric Wilhelmus Josephus Van Steen, Wester Cape (ZA); Frank Roessner, Oldenburg (DE); Andreas Karl Rausch, Neuss (DE)

(73) Assignee: University of Cape Town, Cape Town (ZA)

( * ) Notice: Subject to any disclaimer, the term of this patent is extended or adjusted under 35 U.S.C. 154(b) by 117 days.

(21) Appl. No.: 12/937,694

(22) PCT Filed: Apr. 15, 2009

(86) PCT No.: PCT/IB2009/005256
§ 371 (c)(1),
(2), (4) Date: Dec. 16, 2010

(87) PCT Pub. No.: WO2009/127950
PCT Pub. Date: Oct. 22, 2009

(65) Prior Publication Data
US 2011/0160510 A1    Jun. 30, 2011

(30) Foreign Application Priority Data
Apr. 16, 2008 (ZA) .................................. 2008/03392

(51) Int. Cl.
*C07C 1/00* (2006.01)
(52) U.S. Cl.
USPC ........... 585/638; 518/715; 518/721; 502/260; 502/326
(58) Field of Classification Search
USPC .................................. 585/638; 518/715, 721
See application file for complete search history.

(56) References Cited

U.S. PATENT DOCUMENTS 2,707,713 A * 5/1955 Mattox .................... 518/718
2,821,537 A   1/1958 Rottig
(Continued)

FOREIGN PATENT DOCUMENTS

WO    WO 0149809 A1 * 7/2001

OTHER PUBLICATIONS

Jess, A., Hedden, K. and Popp, R. (2001), Diesel Oil from Natural Gas by Fischer-Tropsch Synthesis Using Nitrogen-Rich Syngas. Chem. Eng. Technol., 24, 27-31.*

(Continued)

*Primary Examiner* — In Suk Bullock
*Assistant Examiner* — Jelitza Perez
(74) *Attorney, Agent, or Firm* — Bozicevic, Field & Francis LLP; Bret E. Field

(57) ABSTRACT

A process is provided for the production of hydrocarbons from synthesis gas wherein the synthesis gas is fed to a reactor in which a catalyst acts on the feed at a temperature of between 160° C. and 400° C. and a pressure of between 1 bar and 5 bar. The feed includes a compound containing one or both nitrogen and phosphorus added to the reactor with the synthesis gas. The compound containing nitrogen typically constitutes at least 1 vol % and preferably of the order of 4 to 20 vol % or more of the feed. The carbonaceous gas may be carbon monoxide with a ratio of hydrogen to carbon monoxide in the synthesis gas of from 0.5:1 to 5:1. The catalyst is preferably a supported cobalt catalyst and may be modified with a promoter. The process produces an enhanced proportion of olefins, in the hydrocarbons produced.

18 Claims, 2 Drawing Sheets

(56) References Cited

U.S. PATENT DOCUMENTS

| | | | | |
|---|---|---|---|---|
| 4,704,496 | A | * | 11/1987 | Paparizos et al. .............. 585/500 |
| 6,100,304 | A | * | 8/2000 | Singleton et al. .............. 518/715 |
| 6,239,184 | B1 | | 5/2001 | Beer et al. |
| 6,586,480 | B1 | | 7/2003 | Zhou |
| 2005/0154069 | A1 | * | 7/2005 | Inga et al. ..................... 518/726 |
| 2007/0254966 | A1 | * | 11/2007 | Eskin et al. ................... 518/702 |

OTHER PUBLICATIONS

R.L. Espinoza, A.P. Steynberg, B. Jager, A.C. Vosloo, Low temperature Fischer-Tropsch synthesis from a Sasol perspective Available online Sep. 16, 1999.*

* cited by examiner

PROCESS FOR THE PRODUCTION OF HYDROCARBONS INCLUDING OLEFINS FROM SYNTHESIS GAS

FIELD OF THE INVENTION

This invention relates to a process for the production of hydrocarbons from synthesis gas and, more particularly, to a process in which the production of olefins, especially linear olefins, during the relevant reactions of carbon oxides is enhanced.

BACKGROUND TO THE INVENTION

Fischer-Tropsch carbon monoxide hydrogenation is a catalysed process in which a carbon monoxide and hydrogen mixture, typically referred to a "synthesis gas" or "syngas", is converted into liquid hydrocarbons, predominantly linear hydrocarbons (olefins and paraffins) of different chain length. Small amounts of oxygenates, mainly alcohols and aldehydes, can also be formed. The products can be used to produce transportation fuels such as diesel and petrol. Alternately, or in addition, valuable chemicals such as olefins and oxygenates can be extracted from the product.

The synthesis gas can include carbon dioxide as well as carbon monoxide or water as well as hydrogen, and may also include combinations of all four of these reactants.

There is a considerable difference in the value of paraffins and olefins with mixtures predominating in paraffins being of relatively low value and primarily usable for the production of transportation fuels and waxes, whilst olefins themselves, are of substantially greater value and are usable for numerous other purposes.

In recent times, cobalt based catalysts have become an attractive alternative to iron based catalysts as those most widely used in Fischer-Tropsch reactions. Studies have reported that nitrogen containing compounds act as a poison or inhibitor to these catalysts. In an attempt to overcome this, published international patent application number WO 2005/071044 discloses a process for pre-treating a catalyst such that it loses no more than 50% of its activity in the presence of trace amounts of ammonia (parts per billion levels) in a feed to a Fischer-Tropsch reaction.

WO 2001/049809 and WO 2001/049808 describe a process in which ammonia is co-fed to the reduction gas during catalyst pre-treatment. An increase of C5+ selectivity and chain growth probability as well as a decrease in methane selectivity was reported.

A further problem often encountered with Fischer-Tropsch type reactions is that it is very difficult to selectively control the production of valuable products, especially olefins.

OBJECT OF THE INVENTION

It is an object of this invention to provide a process for the production of hydrocarbons from synthesis gas which at least partially alleviates some of the problems mentioned above.

SUMMARY OF THE INVENTION

In accordance with this invention there is provided a process for the production of hydrocarbons from synthesis gas during the hydrogenation of a carbonaceous gas component in a synthesis gas in a feed to a reactor in which a catalyst acts on the feed at a temperature of between 160° C. and 400° C. and under a pressure of between 1 bar and 50 bar, the process being characterised in that at least one compound containing one or both of nitrogen and phosphorous is fed to the reactor together with the synthesis gas and in that the catalyst and process conditions are selected to favour the production of olefins.

Further features of the invention provide for the compound containing nitrogen to constitute at least 1 vol % of the feed to the reactor and preferably at least 4 vol % and most preferably at least 20 vol %; for any compound containing phosphorous to be at least 0.01 vol % of the feed; for the catalyst to be selected from cobalt, iron, ruthenium and mixtures thereof, preferably cobalt supported on a suitable carrier material such as alumina, silica, titania or carbon, preferably alumina or silica; for the catalyst to be modified with one or more promoters and in the instance of a cobalt catalyst for the one or more promoters to include a noble metal promoter such as ruthenium, platinum, rhenium or palladium; for the nitrogen containing compound to include ammonia, for any phosphorous containing compound to include phosphines; and for the reactor to be selected from a slurry phase reactor, a fixed bed reactor and a fluidised bed reactor.

According to one aspect of the invention there is provided for the carbonaceous gas to be predominantly carbon monoxide; and for the ratio of hydrogen to carbon monoxide in the synthesis gas to be from 0.5:1 to 5:1.

According to a second aspect of the invention there is provided for the carbonaceous gas to include carbon dioxide.

According to a third aspect of the invention there is provided for the synthesis gas to be a mixture of water and carbon monoxide.

According to a fourth aspect of the invention there is provided for the synthesis gas to be a mixture of all of hydrogen, water, carbon monoxide and carbon dioxide.

In order that the invention may be more fully understood two examples thereof will now be described with reference to the accompanying drawings.

DETAILED DESCRIPTION WITH REFERENCE TO THE DRAWINGS

Example 1

The invention will now be further described by way of example 1. In this example hydrocarbons were produced using a feed of a hydrogen/carbon monoxide synthesis gas and ammonia in a slurry reactor over a 30 wt % cobalt/silicon dioxide catalyst.

The catalyst was prepared via precipitation of cobalt nitrate with ammonia solution on a silica support (Sigma Aldrich Davisil 646; (BET)=110 $m^2$, pore volume=0.3 ml/g). The catalyst precursor was reduced for 16 h at 430° C. in hydrogen flow and afterwards transferred into the slurry reactor embedded in wax to avoid reoxidation.

The reactor was maintained at a temperature of 240° C. and a total pressure of 11 bar. The ratio of carbon monoxide (CO)

to hydrogen (H$_2$) was 1:2 and the residence time was 15 seconds. Ammonia concentrations of 0 vol %, 2.3 vol %, 4.7 vol %, 13.2 vol % and 26.4 vol % of the feed gas were used.

Surprisingly, analysis of the product indicated that the conversion of carbon monoxide was not significantly affected by the addition of ammonia. In some experiments an increase of conversion was even observed. Also the chain growth probability and the C$_5$ and higher hydrocarbons selectivity remained unchanged. The reasons for these observations are at this time unexplained and quite contrary to what the prior art indicates.

Figure 1:
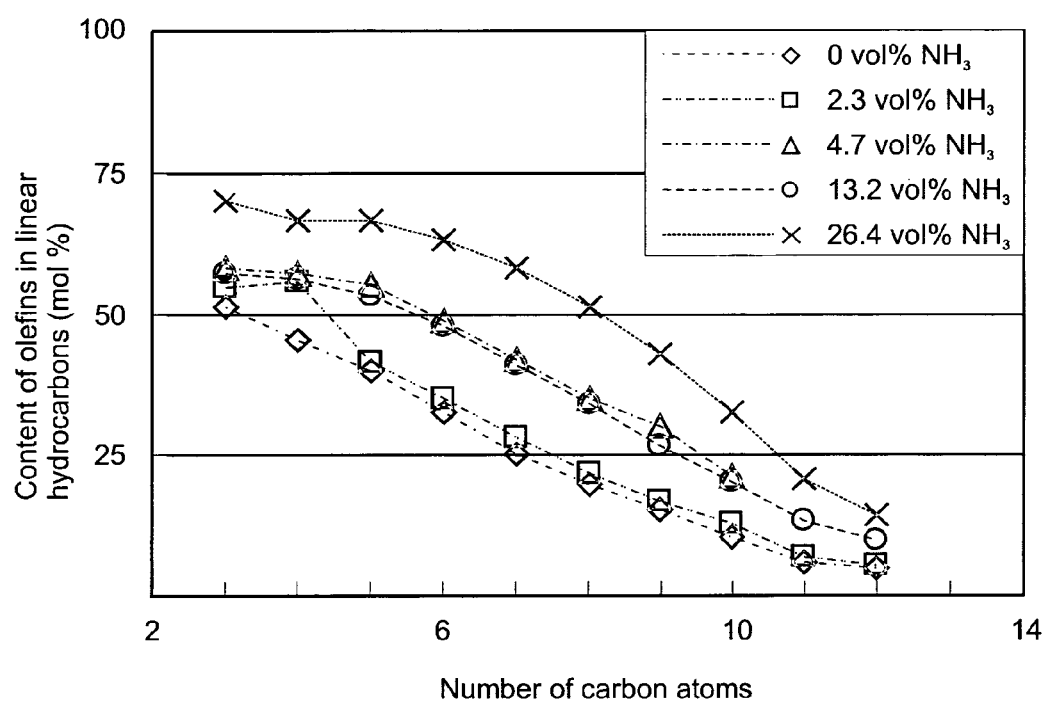
FIG. 1 is a graphical representation showing the increase in the production of olefins after the addition of ammonia and with increasing ammonia concentration during Fischer-Tropsch synthesis in a slurry reactor using a supported cobalt catalyst.

Importantly, the production of olefins was increased after addition of ammonia. With increasing ammonia concentration an increase of the content of olefins was obtained. At the highest ammonia partial pressure the content of olefins was twice as high compared to the reference experiment without any addition of ammonia. The results are shown in Table 1 (see page 7) and a graphical representation thereof is illustrated in FIG. 1.

Furthermore, up to 1 wt. % of nitrogen containing compounds were detected in the total organic product. These tended to be amines and amides in the ratio 20:80. The chain length of these compounds was 1 to 7 carbon atoms.

Example 2

Two supported catalysts containing 15 wt. % cobalt and 15 wt. % iron on silica, respectively, (Sigma Aldrich Davisil 646; surface(BET)=110 m$^2$, pore volume=0.3 ml/g) were prepared via impregnation using the corresponding metal nitrate salts. The catalyst precursors were dried and then 165 mg of it was reduced in-situ in the fixed bed reactor using a flow of 60 ml/min of hydrogen for 9 h at 500° C. The reaction was carried in the gas phase at an absolute pressure of 5 bar and at temperatures of 170 to 320° C. The products were analysed by on-line gas chromatography.

The effect of ammonia on the cobalt catalyst was investigated at 170° C. and the effect on the iron catalyst at 300° C. The applied gas mixture contained 25 vol. % CO, 50 vol. % H$_2$ and 25 vol. % NH$_3$.

On the iron containing catalyst the addition of ammonia to the synthesis gas slightly increased the formation of higher olefins at 320° C. (FIG. 2) whereas conversion of CO, selectivity of methane and chain growth probability showed no significant changes due to addition of ammonia.

Figure 2:
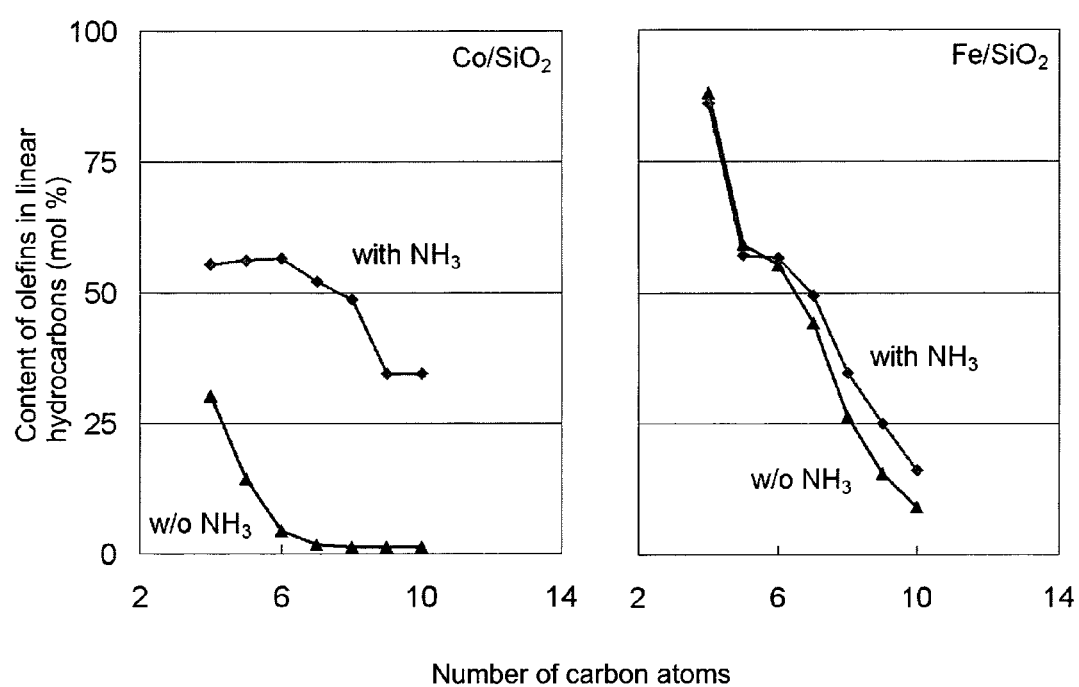
FIG. 2 is a graphical representation showing the increase in the production of olefins after the addition of ammonia during Fischer-Tropsch synthesis in a fixed bed reactor using a supported cobalt catalyst and a supported iron catalyst.

Surprisingly, ammonia showed a pronounced effect on the reaction on the cobalt catalyst at 170° C.: The addition of ammonia led to a decrease of the conversion of CO and the selectivity of methane. The amount of olefins in the fraction of hydrocarbons increased significantly (FIG. 2).

The process of the invention is surprising in a number of ways. Firstly, the relatively large amounts of ammonia do not deactivate the catalysts as indicated in the prior art where trace amounts were reported to poison the catalysts. Secondly, the process permits highly selective production of olefins and relatively small amounts of paraffins. It is suspected that the reason for this is that ammonia blocks hydrogenation of olefins to paraffins. For this reason, it is suspected that phosphorous containing compounds, for example PH$_3$, may be equally effective in this role. Thirdly, the other selectivities of the process remain largely unchanged. The process can thus be relatively easily implemented in existing sites without altering synthesis gas feedstocks or catalysts.

It will be appreciated, however, that many other embodiments of the invention exist which fall within the scope of the invention, particularly regarding the feed materials, reaction conditions, reactor type and catalyst type.

TABLE 1

| | Olefins in linear hydrocarbons (mol %) (paraffins substantially make up the balance) | | | | |
|---|---|---|---|---|---|
| C-Number | 0 Vol % NH$_3$ | 2.3 Vol % NH$_3$ | 4.7 Vol % NH$_3$ | 13.2 Vol % NH$_3$ | 26.4 Vo % NH$_3$ |
| 3 | 51.4 | 54.5 | 58.0 | 57.2 | 69.8 |
| 4 | 45.5 | 55.6 | 57.1 | 56.0 | 66.3 |
| 5 | 39.8 | 41.5 | 55.1 | 53.4 | 66.3 |
| 6 | 32.5 | 35.1 | 48.8 | 47.9 | 63.1 |
| 7 | 25.3 | 28.0 | 41.7 | 40.8 | 58.1 |
| 8 | 19.7 | 21.8 | 35.0 | 33.9 | 51.4 |
| 9 | 15.2 | 16.7 | 30.0 | 26.6 | 42.7 |
| 10 | 10.5 | 12.7 | 21.4 | 20.1 | 32.4 |
| 11 | 6.0 | 6.9 | | 13.1 | 20.7 |
| 12 | 4.9 | 5.5 | | 9.8 | 14.1 |

The invention claimed is:

1. A process for the production of hydrocarbons from synthesis gas, the process comprising:
   Feeding to a reactor:
   (a) a synthesis gas comprising at least one carbonaceous gas component that is carbon monoxide or carbon dioxide; and
   (b) at least one compound comprising nitrogen wherein the nitrogen compound constitutes at least 4 vol % of the feed
   wherein the reactor comprises a catalyst that acts on the synthesis gas at a temperature of between 160° C. and 400° C. and under a pressure of between 1 bar and 50 bar and the process conditions that are selected to favor the production of olefins over other hydrocarbons.

2. The process of claim 1, wherein the nitrogen compound constitutes at least 20 vol % of the feed.

3. The process of claim 1, wherein the at least one compound further comprises a phosphorous compound and wherein the phosphorous compound constitutes at least 0.01 vol % of the feed.

4. The process of claim 1, wherein the catalyst is selected from cobalt, iron, ruthenium and mixtures thereof.

5. The process of claim 2, wherein the catalyst is a cobalt catalyst supported on a suitable carrier material including any one or more of alumina, silica, titania and carbon.

6. The process of claim 1, wherein the catalyst is modified with one or more promoters.

7. The process of claim 6, wherein the catalyst is a cobalt catalyst modified utilizing one or more promoters selected from a noble metal promoter including ruthenium, platinum, rhenium or palladium.

8. The process of claim 1, wherein the nitrogen compound is ammonia.

9. The process of claim 1, wherein the reactor is selected from a slurry phase reactor, a fixed bed reactor and a fluidised bed reactor.

10. The process of claim 1, wherein the carbonaceous gas component is predominantly carbon monoxide.

11. The process of claim 7, wherein the synthesis gas comprises hydrogen and carbon monoxide and the ratio of hydrogen to carbon monoxide in the synthesis gas is from 0.5:1 to 5:1.

12. The process of claim 1, wherein the carbonaceous gas component comprises carbon dioxide and wherein the synthesis gas is predominantly a mixture of hydrogen and carbon monoxide and/or carbon dioxide.

13. The process of claim 1, wherein the synthesis gas comprises hydrogen, water, carbon monoxide and carbon dioxide.

14. The process of claim 3, wherein the phosphorous compound is a phosphine.

15. The process of claim 1, wherein the at least one compound comprises nitrogen and phosphorous.

16. The process of claim 1, wherein the process conditions comprise a temperature ranging from 160° C. and 400° C. and a pressure ranging from 1 bar and 50 bar.

17. The process of claim 16, wherein the process conditions comprise a temperature ranging from 170° C. to 320° C.

18. The process of claim 1, wherein the process conditions are selected to favor the production of olefins over paraffins.

* * * * *